US012589644B2

(12) United States Patent
Kucharski et al.

(10) Patent No.: US 12,589,644 B2
(45) Date of Patent: Mar. 31, 2026

(54) DRIVE AXLE SYSTEM HAVING AN ELECTRIC MOTOR

(71) Applicant: ArvinMeritor Technology, LLC, Troy, MI (US)

(72) Inventors: Cyril Kucharski, Saint-Etienne (FR); Alexandre Moreton, Saint-Etienne (FR); Felix Rudolph, Nuremberg (DE); Marco Schramm, Nuremberg (DE); I-Chao Chung, Troy, MI (US); Jerome Kunert, Warren, MI (US); Dan S. Ursu, Windsor (CA)

(73) Assignee: ArvinMeritor Technology, LLC, Troy, MI (US)

( * ) Notice: Subject to any disclaimer, the term of this patent is extended or adjusted under 35 U.S.C. 154(b) by 292 days.

(21) Appl. No.: 18/545,274

(22) Filed: Dec. 19, 2023

(65) Prior Publication Data

US 2025/0196613 A1      Jun. 19, 2025

(51) Int. Cl.
| | |
|---|---|
| *B60K 7/00* | (2006.01) |
| *B60B 27/00* | (2006.01) |
| *B60B 35/00* | (2006.01) |
| *B60B 35/12* | (2006.01) |
| *B60K 17/04* | (2006.01) |

(Continued)

(52) U.S. Cl.
CPC ........ *B60K 7/0007* (2013.01); *B60B 27/0052* (2013.01); *B60B 27/0073* (2013.01); *B60B 35/006* (2013.01); *B60B 35/125* (2013.01); *B60K 17/046* (2013.01); *F16H 1/28* (2013.01); *F16H 57/0423* (2013.01); *B60K 2007/0061* (2013.01)

(58) Field of Classification Search
CPC ........... B60B 27/0052; B60B 27/0073; B60B 35/006; B60B 35/125; B60B 35/12; B60K 7/0007; B60K 2007/0061; B60K 2007/0038; B60K 17/046; F16H 1/28; F16H 57/0423; H02K 7/006; H02K 7/116
See application file for complete search history.

(56) References Cited

U.S. PATENT DOCUMENTS

| | | | | |
|---|---|---|---|---|
| 3,812,928 A | * | 5/1974 | Rockwell | ................ B60L 50/51 |
| | | | | 310/67 R |
| 5,382,858 A | * | 1/1995 | Sugiyama | ............... F16C 19/55 |
| | | | | 310/90 |

(Continued)

FOREIGN PATENT DOCUMENTS

| | | | |
|---|---|---|---|
| CN | 203427602 U | | 2/2014 |
| CN | 102555773 B | * | 1/2015 |

(Continued)

OTHER PUBLICATIONS

CN 102555773 translation (Year: 2015).*

(Continued)

*Primary Examiner* — Timothy Hannon
(74) *Attorney, Agent, or Firm* — Brooks Kushman PC

(57) ABSTRACT

A drive axle system comprising a support structure, a mounting plate, an electric motor module, a transmission module, and a wheel end assembly. The electric motor module extends from a first side of the mounting plate. The transmission module extends from the second side of the mounting plate. The wheel end assembly extends from the transmission module.

20 Claims, 13 Drawing Sheets

(51) Int. Cl.
    *F16H 1/28*         (2006.01)
    *F16H 57/04*       (2010.01)

(56)            References Cited

U.S. PATENT DOCUMENTS

| | | | |
|---|---|---|---|
| 5,472,059 A * | 12/1995 | Schlosser | B60K 7/0007 |
| | | | 475/159 |
| 6,722,459 B1 * | 4/2004 | Wendl | B60L 15/2054 |
| | | | 180/65.51 |
| 7,364,528 B2 | 4/2008 | Brill et al. | |
| 8,794,280 B2 | 8/2014 | Flory et al. | |
| 9,278,587 B2 | 3/2016 | Honig | |
| 9,283,818 B2 | 3/2016 | Keeney et al. | |
| 9,315,077 B2 | 4/2016 | Flory et al. | |
| 9,333,813 B2 | 5/2016 | Tiziani et al. | |
| 9,428,016 B2 | 8/2016 | Keeney et al. | |
| 9,452,644 B2 | 9/2016 | Keeney et al. | |
| 9,452,645 B2 | 9/2016 | Polubinski et al. | |
| 9,481,213 B2 | 11/2016 | Keeney et al. | |
| 9,517,663 B2 | 12/2016 | Lewandowski et al. | |
| 9,539,865 B2 | 1/2017 | Lakin et al. | |
| 9,597,931 B2 | 3/2017 | Dean et al. | |
| 9,713,854 B2 | 7/2017 | Zhai et al. | |
| 9,809,065 B2 | 11/2017 | Polubinski et al. | |
| 9,815,340 B2 | 11/2017 | Trostle et al. | |
| 9,919,569 B2 | 3/2018 | Lewandowski et al. | |
| 10,035,384 B2 | 7/2018 | Keeney et al. | |
| 10,052,923 B2 | 8/2018 | Power et al. | |
| 10,391,824 B2 | 8/2019 | Trostle et al. | |
| 10,500,940 B2 | 12/2019 | Garcia et al. | |
| 10,500,941 B2 | 12/2019 | Garcia et al. | |
| 11,346,439 B1 * | 5/2022 | Langenfeld | F16H 57/082 |
| 11,505,061 B2 | 11/2022 | Mepham et al. | |
| 2005/0268464 A1 | 12/2005 | Burjes et al. | |
| 2010/0116569 A1 | 5/2010 | Morrow et al. | |
| 2012/0178574 A1 | 7/2012 | Grochowski et al. | |
| 2012/0235462 A1 | 9/2012 | Yamamoto et al. | |
| 2014/0041481 A1 | 2/2014 | Pinotti | |
| 2015/0096655 A1 | 4/2015 | Koulinitch et al. | |
| 2015/0306975 A1 | 10/2015 | Timan et al. | |
| 2019/0023128 A1 * | 1/2019 | Tesar | B60K 17/08 |
| 2019/0039409 A1 | 2/2019 | Eschenburg et al. | |
| 2019/0054816 A1 | 2/2019 | Garcia et al. | |
| 2019/0331173 A1 | 10/2019 | Eschenburg et al. | |
| 2021/0061093 A1 * | 3/2021 | Li | H02K 7/083 |
| 2021/0102610 A1 | 4/2021 | Ghatti et al. | |
| 2021/0387475 A1 | 12/2021 | Keeney et al. | |
| 2022/0320946 A1 | 10/2022 | Varela et al. | |
| 2022/0371361 A1 | 11/2022 | Varela et al. | |
| 2024/0399851 A1 * | 12/2024 | Schramm | H02K 7/08 |
| 2025/0075773 A1 * | 3/2025 | May | B60K 17/046 |

FOREIGN PATENT DOCUMENTS

| | | | | |
|---|---|---|---|---|
| CN | 110469645 A * | 11/2019 | | F16H 57/0495 |
| DE | 102017005462 A1 | 11/2017 | | |
| EP | 1950072 B1 | 10/2010 | | |
| WO | 2019017786 A1 | 1/2019 | | |
| WO | 2019217861 A1 | 11/2019 | | |
| WO | 2019233329 A1 | 12/2019 | | |

OTHER PUBLICATIONS

CN 110469645 translation (Year: 2019).*
Extended European Search Report dated May 12, 2025 for related European Appln. No. 24218914.0; 10 Pages.

\* cited by examiner

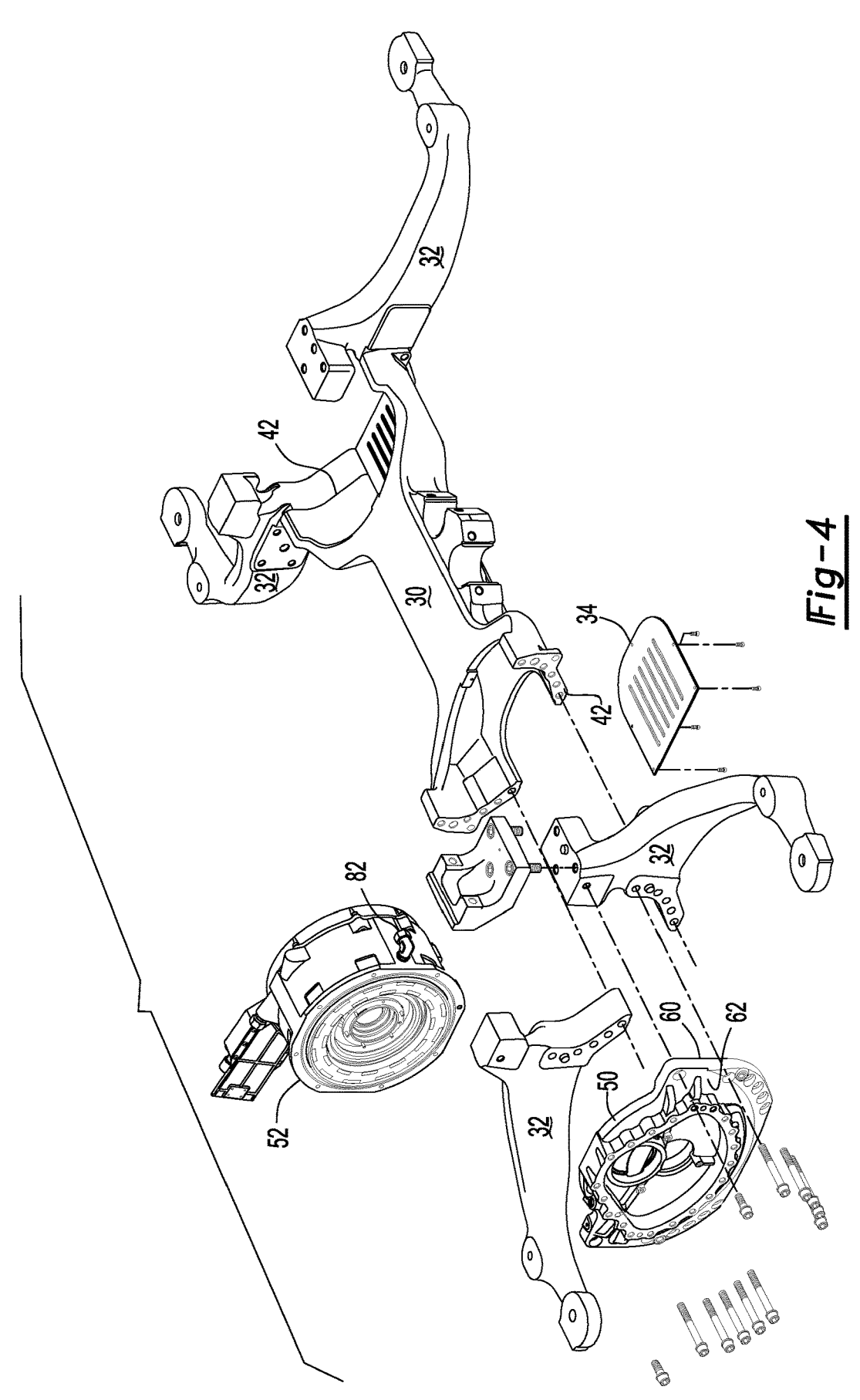
_Fig-4_

_Fig-7_

DRIVE AXLE SYSTEM HAVING AN ELECTRIC MOTOR

TECHNICAL FIELD

This relates to a drive axle system that includes an electric motor.

BACKGROUND

An axle assembly having an electric motor is disclosed in U.S. Patent Publication No. 2022/0320946.

SUMMARY

The invention relates to a drive axle system. The drive axle system comprises a support structure, a mounting plate, an electric motor module, a transmission module, and a wheel end assembly. The support structure includes a cradle and first and second arms. The first and second arms extend from the cradle. The mounting plate is fixedly coupled to the first and second arms. The mounting plate further comprises a first side and a second side. The second side is disposed opposite the first side. The electric motor module extends from the first side of the mounting plate. The transmission module extends from the second side of the mounting plate. The wheel end assembly extends from the transmission module.

The first and second arms may separate the mounting plate from the cradle. The first and second arms may be spaced apart from each other. The first and second arms may extend from the cradle to the mounting plate. The electric motor module may be spaced apart from the cradle. The electric motor module may be spaced apart from the first and second arms. The electric motor module may not contact the cradle. The electric motor module may not contact the first and second arms.

A skid plate may extend under the electric motor module. The skid plate may be fastened to the support structure.

The electric motor module may further comprise a rotor. The rotor may be rotatable about a rotor axis. The electric motor module may further comprise a stator. The stator may encircle the rotor. The electric motor module may further comprise a coolant jacket. The coolant jacket may encircle the stator. The coolant jacket may further comprise a set of channels. The set of channels may not be encircled by the mounting plate. The electric motor module may further comprise a rotor shaft. The rotor shaft may extend from the rotor.

The mounting plate may define a hole. The rotor shaft may extend through the hole. A bearing assembly may be disposed in the hole. The bearing assembly may rotatably support the rotor shaft.

The cover may be secured to the mounting plate. The cover may define a cover hole. The rotor shaft may extend through the cover hole. The cover may receive a seal. The seal may extend between the cover and the rotor shaft. The rotor may encircle the cover.

The wheel end assembly may further comprise a wheel hub. The wheel hub may be rotatable about a wheel axis.

The wheel end assembly may further comprise a hub housing. The hub housing may extend from the wheel hub. The hub housing may extend away from the transmission module.

The wheel end assembly may further comprise a gear reduction module. The gear reduction module may be received in the hub housing. The gear reduction module may include a planet gear carrier. The planet gear carrier may be coupled to the hub housing such that the planet gear is rotatable about the wheel axis with the hub housing and the wheel hub. The planet gear carrier may be disposed at an end of the hub housing. The end of the hub housing may face away from the wheel hub.

The wheel end assembly may further comprise a hub cap. The hub cap may be fastened to the planet gear carrier.

The wheel end assembly may further comprise a wheel end shaft. The wheel end shaft may be rotatable about the wheel axis. The wheel end shaft may operatively connect the transmission module to the gear reduction module. The wheel end shaft may further comprise a sun gear. The sun gear may mesh with a planet gear that is rotatably supported on the planet gear carrier.

The transmission module may further comprise a spindle. The wheel end shaft may extend through the spindle. The gear reduction module may further comprise a ring gear. The ring gear may be disposed in the hub housing. The ring gear may be fixedly mounted to the spindle. The ring gear may not be rotatable about the wheel axis. The hub housing may be rotatable about the wheel axis with respect to the ring gear.

A seal may be disposed inside the spindle. The seal may extend from the wheel end shaft to the spindle.

The transmission module may further comprise an outboard transmission housing. The outboard transmission housing may extend from the mounting plate.

A second gear may be rotatable about the wheel axis with the wheel end shaft. A first gear may mesh with the second gear. The first gear may be rotatable about the rotor axis with the rotor.

The transmission module may further comprise a lubricant baffle. The lubricant baffle may extend from the mounting plate to the outboard transmission housing. The first gear may be received in the lubricant baffle. The second gear may be received in the lubricant baffle. A brake assembly may be fastened to the outboard transmission housing.

BRIEF DESCRIPTION OF THE DRAWINGS

FIG. 4 is a partially exploded view of FIG. 3.

FIG. 7 is a perspective view of a transmission module of the axle assembly disposed on the mounting plate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
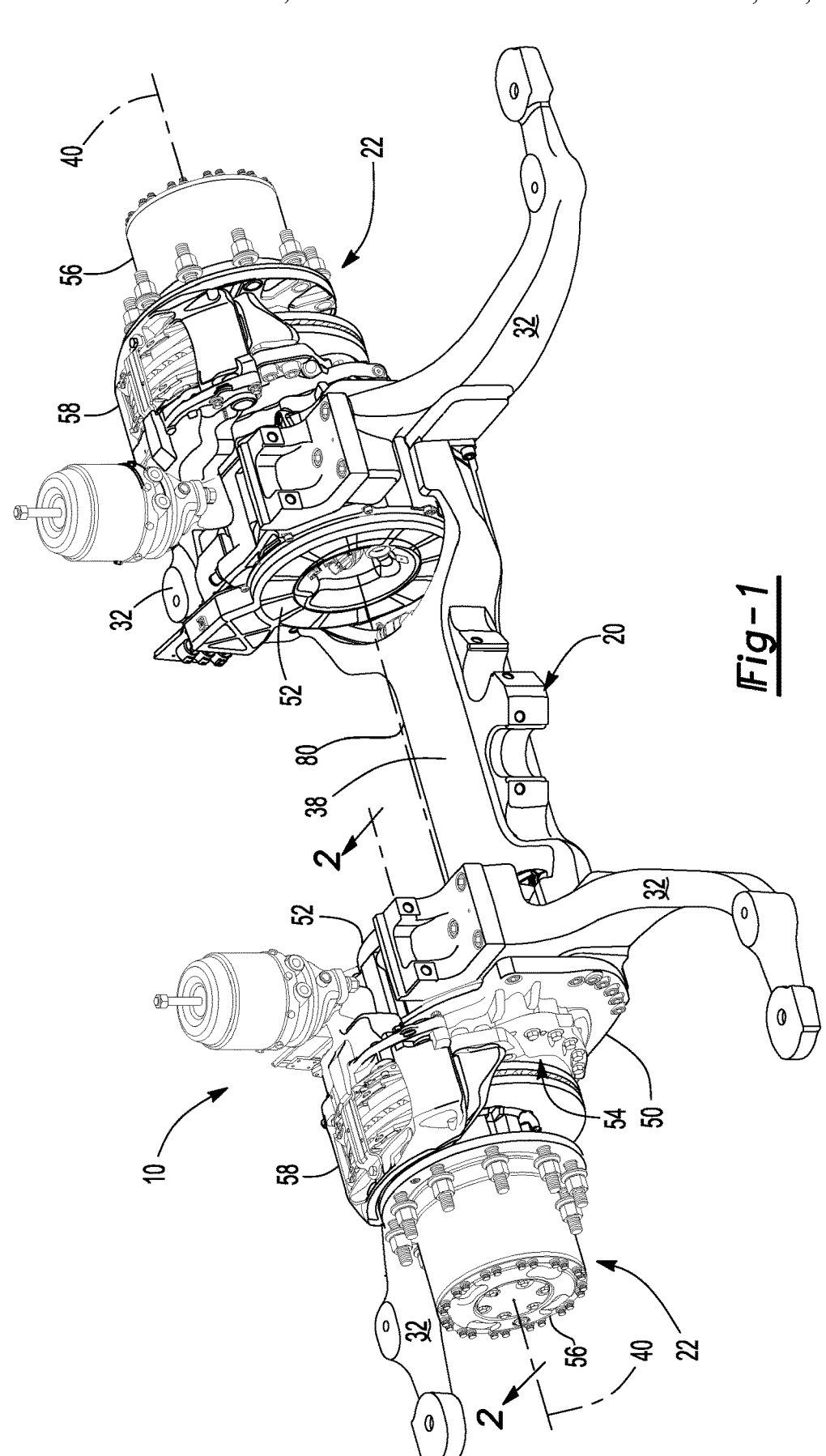
FIG. 1 is a perspective view of an example of a drive axle system that includes a support structure and a pair of axle assemblies.

Referring to FIG. 1, an example of a drive axle system 10 is shown. The drive axle system 10 may be provided with a vehicle like a bus, car, truck, or the like. The drive axle system 10 includes a support structure 20 and at least one axle assembly 22. Two axle assemblies 22 are depicted in FIG. 1.

The support structure 20 is configured to support the axle assemblies 22. In addition, the support structure 20 operatively connects the axle assemblies 22 to a suspension system. The suspension system connects the support structure 20 to a frame or chassis of the vehicle. In addition, the suspension system may dampen vibrations associated with vehicle travel, provide a desired level of ride quality, help control vehicle ride height, or combinations thereof. In some configurations, the support structure 20 includes a cradle 30 and a plurality of arms 32. The support structure 20 may optionally include a skid plate 34, an example of which is best shown in FIGS. 3 and 4.

Figure 3:
FIG. 3 is a perspective view of a portion of the drive axle system including the support structure, an electric motor module, and a mounting plate.
Figure 6:
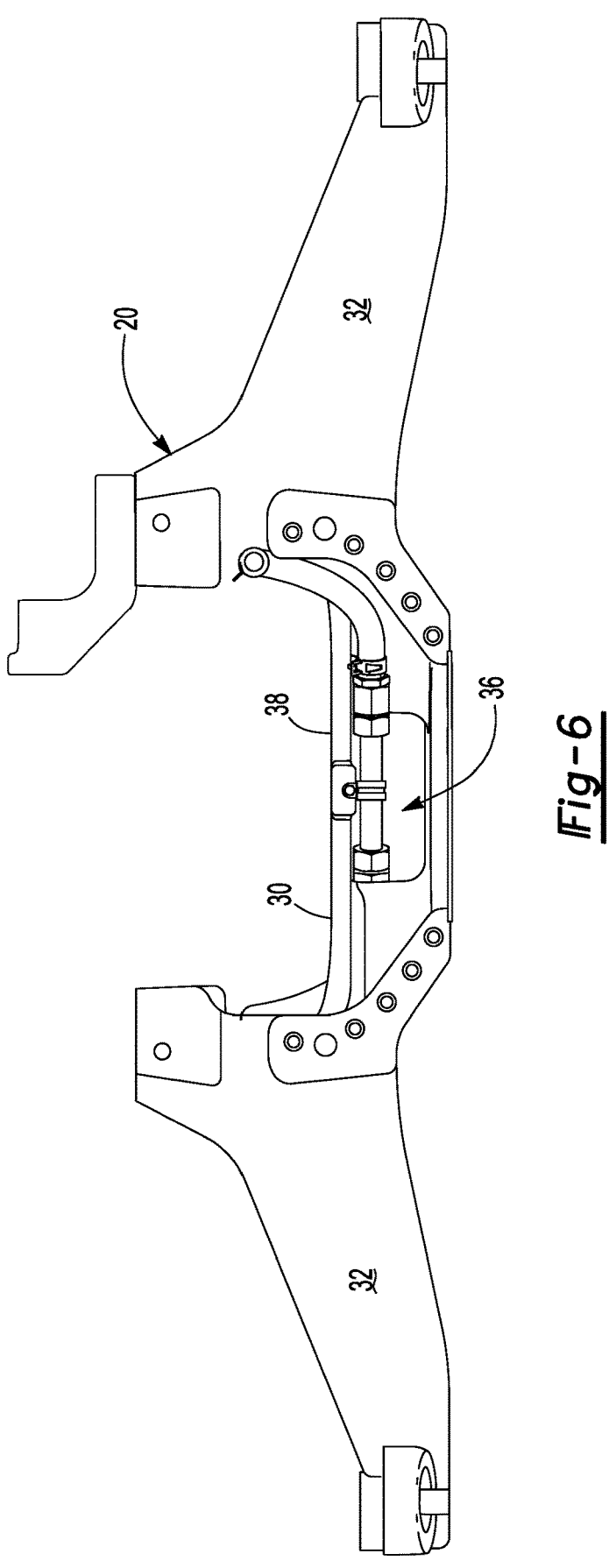
FIG. 6 is a lateral side view of FIG. 3 with the mounting plate and electric motor module omitted for clarity.

Referring to FIGS. 1, 3, and 4, the cradle 30 supports the axle assemblies 22. For example, the cradle 30 may extend in a lateral direction or a direction that extends from the left side of the vehicle to the right side of the vehicle. An axle assembly 22 may be disposed near each lateral end of the cradle 30 (e.g., near opposite ends of the cradle 30 that face toward the arms 32). In some configurations and as is best shown in FIG. 6, the cradle 30 is configured as a hollow tubular structure that has an internal passage 36 that extends between the opposing lateral ends of the cradle 30. The cradle 30 may partially wrap around an axle assembly 22 and may extend below or underneath an axle assembly 22. The cradle 30 may have a top surface 38.

Referring primarily to FIGS. 1 and 3, the top surface 38 is disposed between the axle assemblies 22 and is positioned below a wheel axis of rotation or wheel axis 40. Such a configuration may provide a gap located above the top surface 38 and between the axle assemblies 22 through which a portion of the vehicle body structure of the vehicle may extend. For instance, a portion of the vehicle body structure that defines a floor or aisle of the vehicle may be located between the axle assemblies 22 and above the top surface 38, thereby positioning floor or aisle closer to the ground or road upon which the vehicle is disposed. The floor or aisle may extend in a longitudinal direction through the gap and between the axle assemblies 22 such that the bottom of the floor or aisle is positioned below the top of the axle assemblies 22 and below the wheel axis 40. In a vehicle such as a bus, the aisle may be a passenger aisle. In some configurations, the top surface 38 has a generally flat or planar configuration.

Referring primarily to FIGS. 3 and 4, the arms 32 extend from the cradle 30. An arm 32 may be disposed at or extend from a lateral end 42 of the cradle 30 and may generally extend in a longitudinal direction (e.g., forward or backward direction that may be perpendicular to the wheel axis 40 and lateral direction in which the cradle 30 extends). In the configuration shown, four arms 32 are depicted and are arranged such that a pair of arms 32 extend from each lateral end 42 of the cradle 30. One arm 32 of each pair may extend in a forward vehicle direction (i.e., a forward longitudinal direction) while the other arm 32 of each pair may extend in a rearward vehicle direction (i.e., rearward longitudinal direction). For convenience in reference, the individual arms in each pair may be referred to as a first arm and a second arm. The first arm 32 and the second arm 32 may be spaced apart from each other such that an axle assembly 22 is longitudinally positioned between the first arm 32 and the second arm 32. The first arm 32 and the second arm 32 may be spaced apart from and may not contact a corresponding axle assembly 22 that is received therebetween.

Referring primarily to FIG. 6, the skid plate 34, if provided, may extend under a corresponding axle assembly 22. The skid plate 34 may help protect the axle assembly 22 by preventing rocks or other objects from contacting the underside of the axle assembly 22. The skid plate 34 may be fastened to the support structure 20. For instance, the skid plate 34 may be fastened to the cradle 30 and one or more arms 32.

Figure 2:
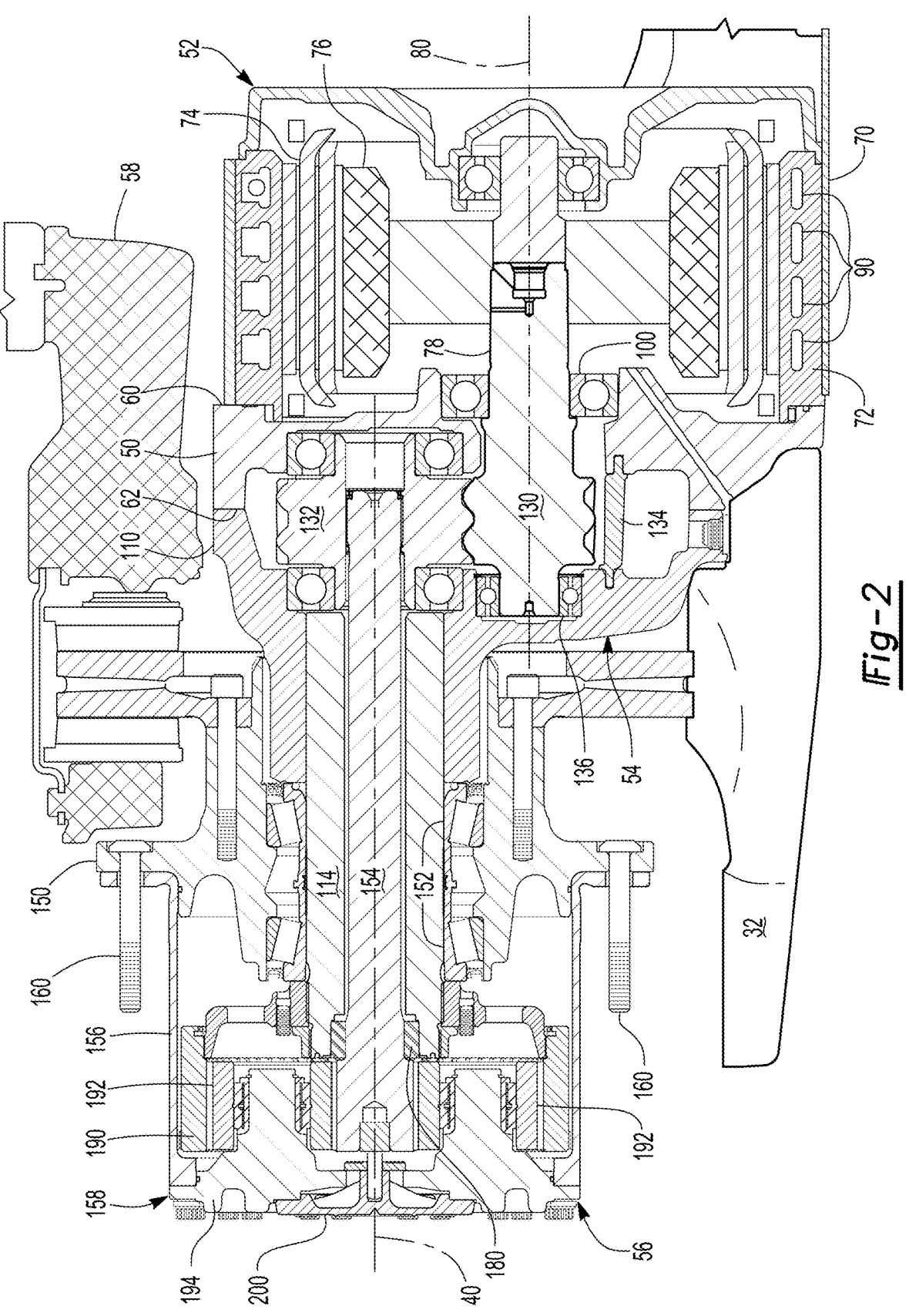
FIG. 2 is a section view of a portion of an axle assembly along section line 2-2.

Referring to FIGS. 1 and 2, an axle assembly 22 is configured to provide torque to an associated traction wheel assembly. In some configurations, the axle assembly 22 includes a mounting plate 50, an electric motor module 52, a transmission module 54, and a wheel end assembly 56, and a brake assembly 58.

Referring primarily to FIGS. 2, 4, 9, and 10, the mounting plate 50 facilitates mounting of the axle assembly 22 to the support structure 20. In some configurations, the mounting plate 50 is fixedly coupled to the first and second arms 32, 32. For instance, the mounting plate 50 may extend from the first and second arms 32, 32 such that the first and second arms 32, 32 are sandwiched between the cradle 30 and the mounting plate 50. As such, the first and second arms 32, 32 may extend from the cradle 30 or lateral end 42 of the cradle 30 to the mounting plate 50. Moreover, the first and second arms 32, 32 may separate the cradle 30 from the mounting plate 50. The mounting plate 50 may be secured to the support structure 20 in any suitable manner, such as with one or more fasteners like bolts.

The mounting plate 50 may extend above the top surface 38 of the cradle 30. In some configurations, the mounting plate 50 is disposed substantially perpendicular to the top surface 38. The term "substantially perpendicular" is used herein to designate features or axes that are the same as or very close to perpendicular and includes features that are within ±3° of being perpendicular each other. In addition, the mounting plate 50 may extend in a longitudinal direction such that the mounting plate 50 may extend between the first arm 32 and the second arm 32. In some configurations, the mounting plate 50 includes a first side 60, a second side 62, and a hole 64.

The first side 60 may face toward the electric motor module 52. As such, the first side 60 may face away from the wheel end assembly 56. The first side 60 may contact or engage the support structure 20. For instance, the first side 60 may contact or engage the first and second arms 32, 32.

The second side 62 is disposed opposite the first side 60. As such, the second side 62 may face away from the electric motor module 52 and may face toward the transmission module 54.

Figure 9:
FIGS. 9 and 10 are exploded views of the transmission module and the mounting plate.

Referring primarily to FIG. 9, the hole 64 may be a through hole that extends from the first side 60 to the second side 62. A rotor shaft of the electric motor module 52 may extend through the hole 64 as will be discussed in more detail below.

Referring to FIGS. 1 and 2, the electric motor module 52, which may also be referred to as an electric motor, is configured to provide torque to the wheel end assembly 56 to help propel the vehicle. In addition, the electric motor module 52 may receive torque from the wheel end assembly 56 to help recover energy or provide regenerative braking. The electric motor module 52 may be electrically connected to an electrical power source, such as a battery, capacitor, or the like. An inverter may electrically connect the electric motor module 52 and the electrical power source in a manner known by those skilled in the art. The electric motor module 52 extends from the first side 60 of the mounting plate 50 in a direction that extends toward the cradle 30 and away from the wheel end assembly 56. The electric motor module 52 may be spaced apart from and may not contact the cradle 30 and the arms 32 of the support structure 20. For instance, the electric motor module 52 may be cantilevered from the mounting plate 50. The electric motor module 52 may have any suitable configuration. In some configurations and as is best shown with reference to FIG. 2, the electric motor module 52 includes a motor housing 70, a coolant jacket 72, a stator 74, a rotor 76, and a rotor shaft 78.

Figure 5:
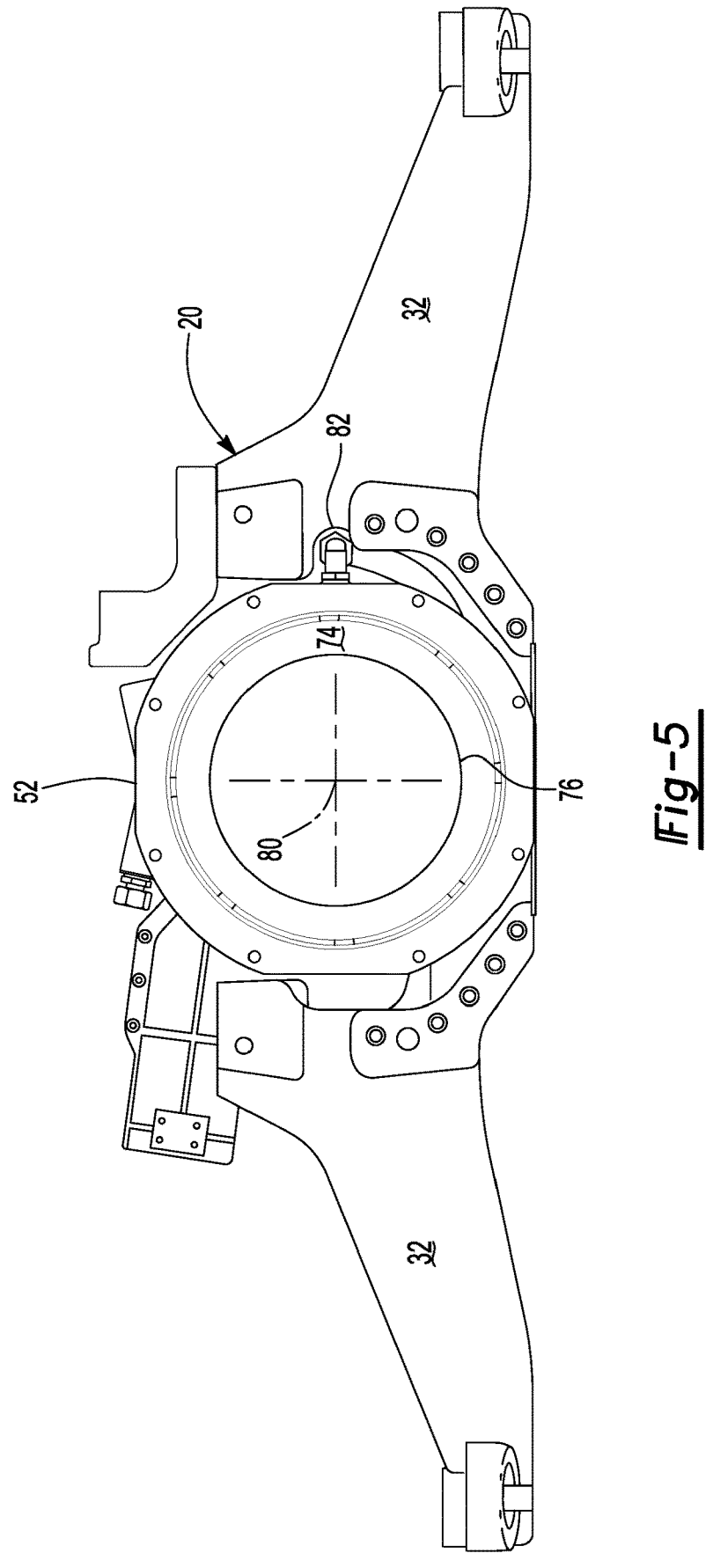
FIG. 5 is a lateral side view of FIG. 3 with the mounting plate omitted for clarity.

The motor housing 70 is disposed along the exterior of the electric motor module 52 that faces away from the rotor shaft 78. The motor housing 70 may be spaced apart from the cradle 30 and the arms 32 of the support structure 20, thereby providing an air gap therebetween to facilitate cooling. The motor housing 70 is fastened to the mounting plate 50. For instance, the motor housing 70 may extend from the first side 60 of the mounting plate 50 and may be secured to the mounting plate 50 with one or more fasteners, such as bolts. The motor housing 70 may encircle or extend at least partially around the coolant jacket 72 and a rotor axis 80. The rotor axis 80 may be disposed parallel or substantially parallel to the wheel axis 40. The term "substantially parallel" as used herein means the same as or very close to parallel and includes features or axes that are within ±3° of being parallel each other. The rotor axis 80 may be positioned below the wheel axis 40 or closer to the ground than the wheel axis 40. In the configuration shown, the wheel axis 40 is positioned directly above the rotor axis 80; however, it is contemplated that the wheel axis 40 may not be disposed directly above the rotor axis 80 in one or more configurations. In some configurations, the motor housing 70 is made of a metal alloy. For instance, the motor housing may be made of an aluminum alloy to facilitate heat conduction from the stator 74. As is best shown in FIGS. 4 and 5, the motor housing 70 may include one or more ports 82 that are fluidly connected to the coolant jacket 72 to facilitate the circulation of coolant.

Referring primarily to FIG. 2, the coolant jacket 72 helps cool or remove heat from the stator 74. The coolant jacket 72 may extend around the rotor axis 80 and may be fixedly positioned with respect to the motor housing 70. The coolant jacket 72 includes a set of channels 90 that facilitate the circulation of coolant therein to cool the stator 74. In some configurations, the channels 90 are received inside the motor housing 70. The channels 90 may not be received inside or may not be encircled by the mounting plate 50. Coolant may be provided to and removed from the channels 90 via one or more ports 82. The coolant jacket 72 may encircle the stator 74.

The stator 74 is received inside the coolant jacket 72 and may be fixedly positioned with respect to the coolant jacket 72. The stator 74 may extend around the rotor axis 80 and may not rotate about the rotor axis 80. The stator 74 may include stator windings that may be received inside and may be fixedly positioned with respect to the coolant jacket 72. The windings may be electrically connected to the electrical power source. The stator 74 may encircle the rotor 76.

The rotor 76 is rotatable about the rotor axis 80 with respect to the stator 74. The rotor 76 may be spaced apart from the stator 74 but may be disposed in close proximity to the stator 74. The rotor 76 may include magnets or ferromagnetic material that may facilitate the generation of electrical current or may be induction-based. The rotor 76 may extend around and may be supported by the rotor shaft 78.

Referring primarily to FIGS. 2 and 9, the rotor shaft 78 may be fixedly mounted to the rotor 76. For instance, the rotor shaft 78 may extend from the rotor 76 such that rotor 76 and the rotor shaft 78 are the rotatable together about the rotor axis 80 and may not rotate with respect to each other. The rotor 76 may encircle the rotor shaft 78. The rotor shaft 78 may extend along the rotor axis 80 or around the rotor axis 80 and may have a one piece construction or a multi-piece construction. The rotor shaft 78 may operatively connect the rotor 76 to the transmission module 54. For instance, the rotor shaft 78 may extend from the rotor 76 through the hole 64 in the mounting plate 50 to the transmission module 54. A bearing assembly 100 may be disposed in the hole 64 and may rotatably support the rotor shaft 78.

Figure 8:
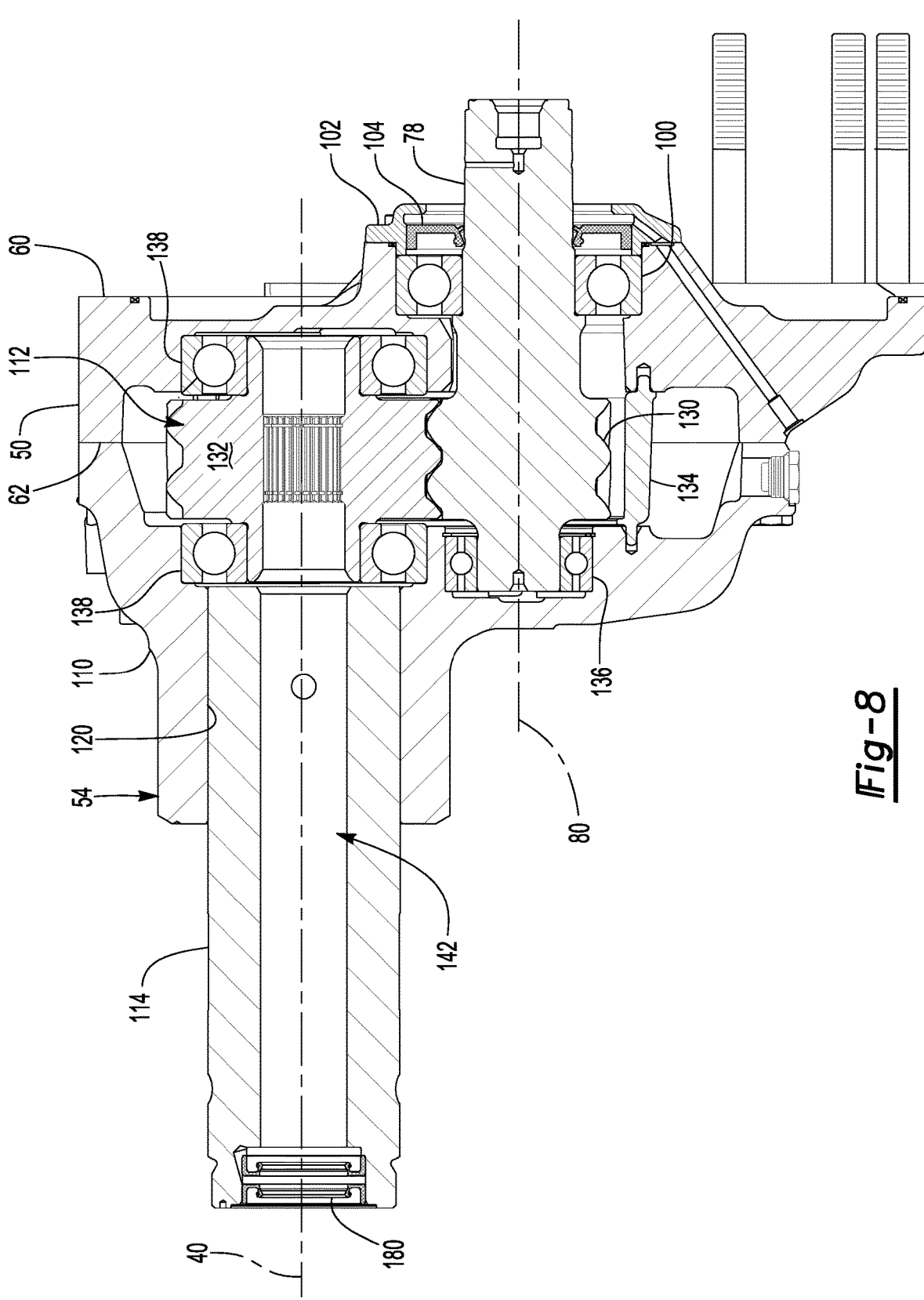
FIG. 8 is a section view along section line 8-8.
Figure 10:
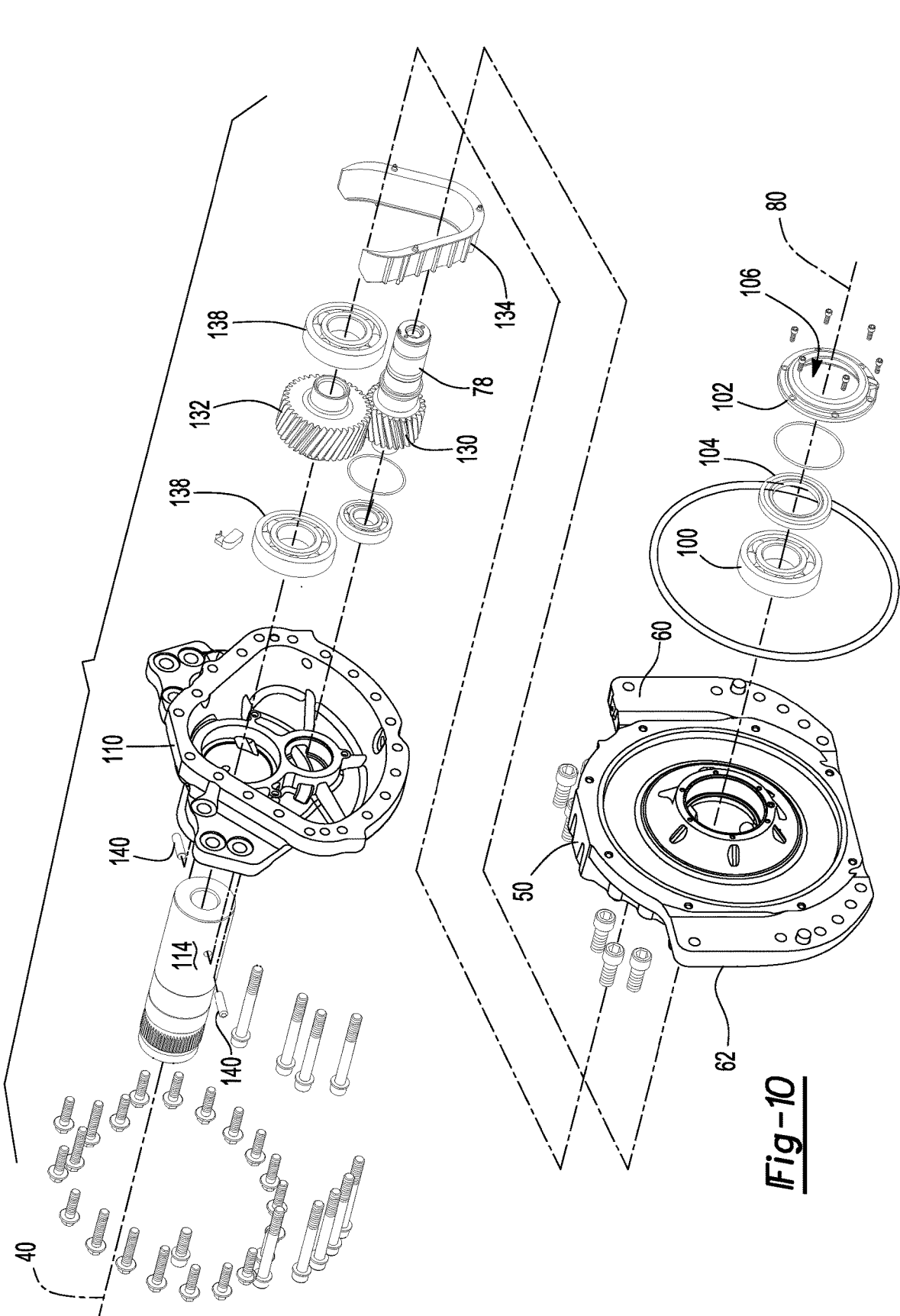

Referring primarily to FIGS. 8-10, a cover 102 and the seal 104 may encircle the rotor shaft 78. The cover 102 and the seal 104 may cooperate to prevent lubricant in the transmission module 54 from entering the electric motor module 52.

The cover 102 may be fixedly positioned with respect to the mounting plate 50. For instance, the cover 102 may be secured to the mounting plate 50, such as with one or more fasteners such as threaded fasteners. The cover 102 may define a cover hole 106 through which the rotor shaft 78 extends.

The seal 104 may encircle the rotor shaft 78 and may extend between the rotor shaft 78 and the cover 102. The seal 104 may be axially positioned between the bearing assembly 100 and the cover 102. In some configurations, the seal 104 is received inside the cover 102 and extends from the rotor shaft 78 to the cover 102. The cover 102, the seal 104, or both may be axially positioned such that the rotor 76 encircles the cover 102, the seal 104, or both.

Referring to FIG. 2, the transmission module 54 operatively connects the electric motor module 52 to the wheel end assembly 56. The transmission module 54 is supported by the mounting plate 50. In the configuration shown, the transmission module 54 extends from the second side 62 of the mounting plate 50. The transmission module 54 may be axially positioned between the electric motor module 52 and the wheel end assembly 56. The transmission module 54 is configured to support the wheel end assembly 56. In some configurations and as is best shown with addition reference to FIG. 8, the transmission module 54 includes an outboard transmission housing 110, a transmission 112, and a spindle 114.

Referring primarily to FIGS. 2 and 7-9, the outboard transmission housing 110 is mounted to the mounting plate 50. For instance, the outboard transmission housing 110 may extend from the second side 62 of the mounting plate 50 in may be secured to the mounting plate 50 with fasteners such as threaded fasteners. The outboard transmission housing 110 may be axially positioned between the wheel end assembly 56 and the mounting plate 50. In addition, the outboard transmission housing 110 may support the wheel end assembly 56. The outboard transmission housing 110 or a portion thereof may be located inside the wheel. In some configurations, the outboard transmission housing 110 includes a spindle receiving hole 120 that facilitates mounting of the spindle 114. The spindle receiving hole 120 may be disposed along the wheel axis 40.

Referring primarily to FIGS. 8 and 9, the transmission 112 is configured to transmit torque between the electric motor module 52 and the wheel end assembly 56. The transmission 112 is received inside a cavity that is disposed between the mounting plate 50 and the outboard transmission housing 110. The transmission 112 includes a plurality of gears that are configured to transmit torque between the electric motor module 52 and the wheel end assembly 56. In some configurations, the transmission 112 includes a first gear 130 and a second gear 132. A lubricant baffle 134 may be associated with the transmission 112.

The first gear 130 is rotatable about the rotor axis 80 with the rotor shaft 78. The first gear 130 may have a plurality of teeth that may extend away from the rotor axis 80. The first gear 130 and the rotor shaft 78 may be directly or indirectly supported by a bearing assembly 136 that may be disposed on the outboard transmission housing 110.

The second gear 132 is rotatable about the wheel axis 40. The second gear 132 may have teeth that may extend away from the wheel axis 40 and that may mate or mesh with teeth of the first gear 130. The second gear 132 may be directly or indirectly rotatably supported by bearing assemblies 138. In the configuration shown, two bearing assemblies 138 are shown with one bearing assembly 138 being disposed on the mounting plate 50 and the other bearing assembly 138 being disposed on the outboard transmission housing 110, respectively.

The lubricant baffle 134 is received inside of the cavity that is disposed between the mounting plate 50 and the outboard transmission housing 110. For example, the lubricant baffle 134 may extend from the mounting plate 50 to the outboard transmission housing 110. The lubricant baffle 134 may receive or contain lubricant that helps lubricate the meshing teeth of the first gear 130 and the second gear 132 as well as the bearing assemblies 100, 136 that rotatably support the rotor shaft 78. In some configurations, the lubricant baffle 134 has a generally U-shaped profile in which the bottom of the lubricant baffle 134 extends underneath the first gear 130 and may be generally aligned with the hole 64 in the mounting plate 50. The lubricant baffle 134 may extend upward such that opposing walls of the lubricant baffle 134 are disposed on opposite sides of the second gear 132. As such, the lubricant baffle 134 may be open at a top end that is disposed proximate the second gear 132. The second gear 132 may be at least partially received in the lubricant baffle 134.

Referring primarily to FIGS. 2, 8, and 9, spindle 114 extends from the outboard transmission housing 110 toward the wheel end assembly 56. For instance, the spindle 114 may be fixedly disposed on the outboard transmission housing 110. In some configurations, the spindle 114 is received in the spindle receiving hole 120 and is secured to the outboard transmission housing 110 in any suitable manner. As an example, the spindle 114 may be secured to the outboard transmission housing 110 with one or more fasteners 140 such as pins, threaded fasteners, or the like. The spindle 114 may extend around the wheel axis 40 and may define a spindle hole 142. The spindle hole 142 may be a through hole that extends along the wheel axis 40.

Referring to FIGS. 2 and 11-13, the wheel end assembly 56 extends from the transmission module 54 and is disposed at an outboard end of the axle assembly 22. For example, the wheel end assembly 56 may be disposed at an outboard end of the axle assembly 22 that may face away from the floor or aisle and that may be disposed opposite the electric motor module 52. In some configurations, the wheel end assembly 56 includes a wheel hub 150, one or more wheel bearings 152, a wheel end shaft 154, a hub housing 156, and a gear reduction module 158.

Figure 11:
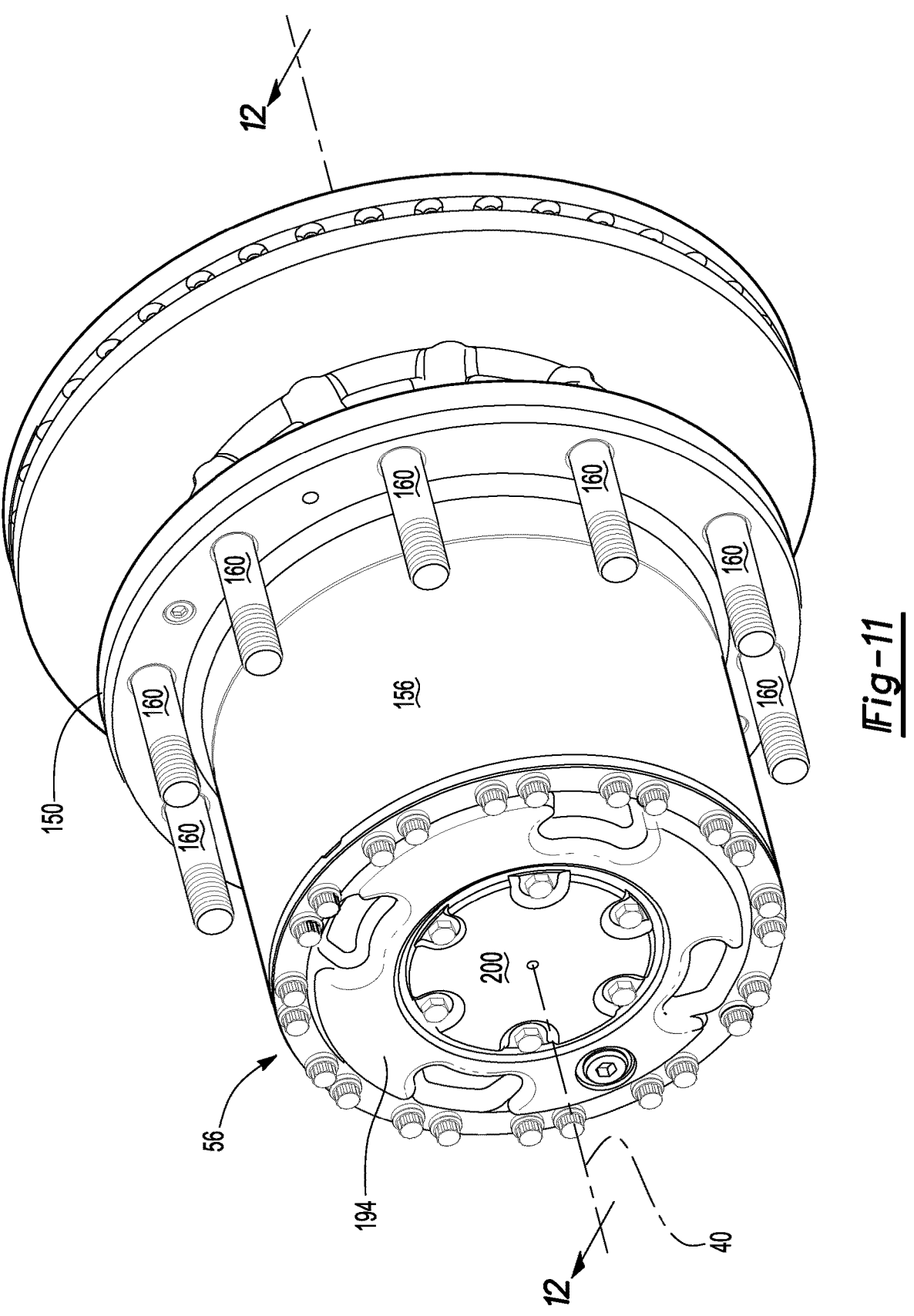
FIG. 11 is a perspective of an example of a wheel end assembly.
Figure 12:
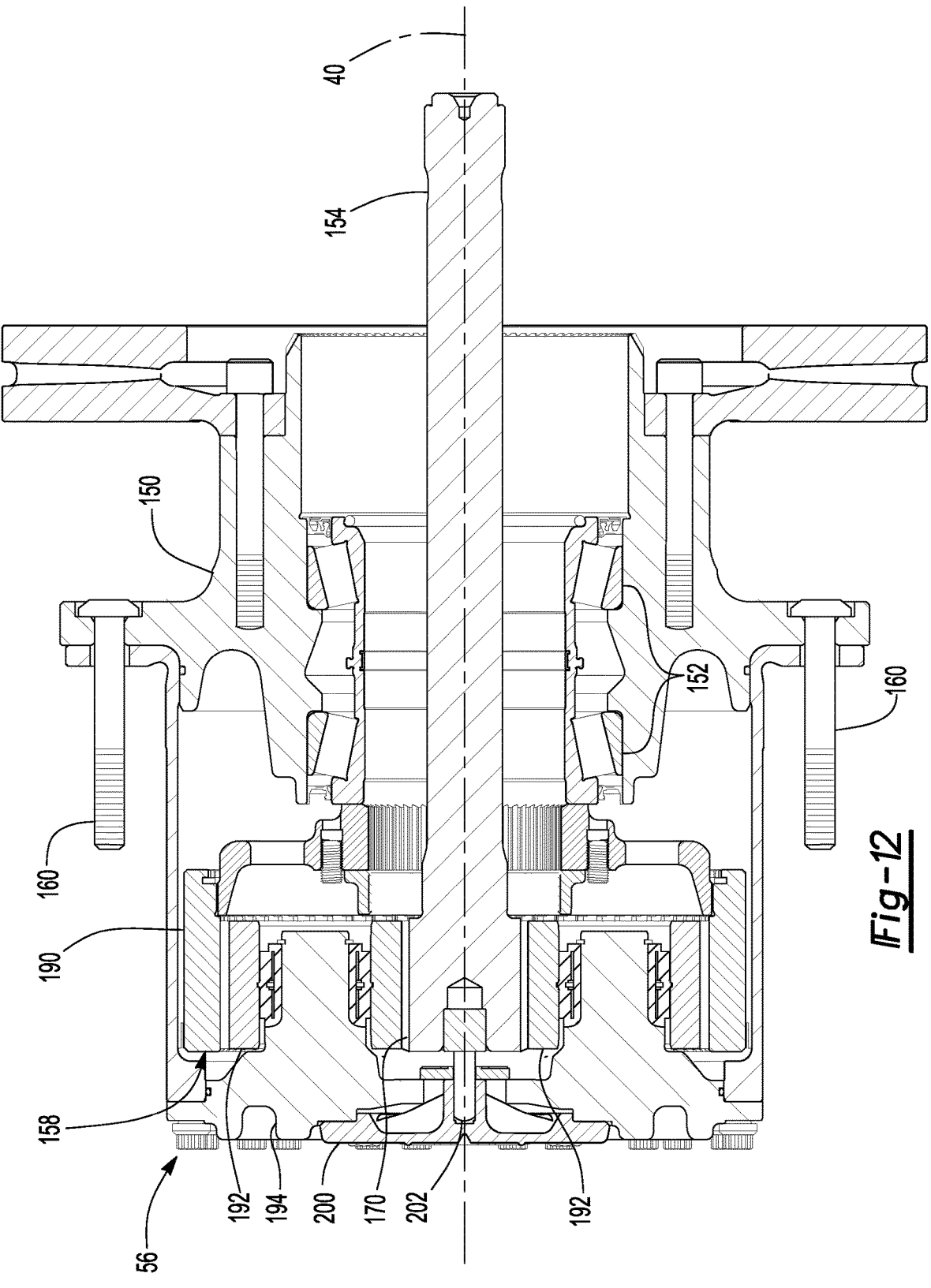
FIG. 12 is a section view of the wheel end assembly along section line 12-12.
Figure 13:
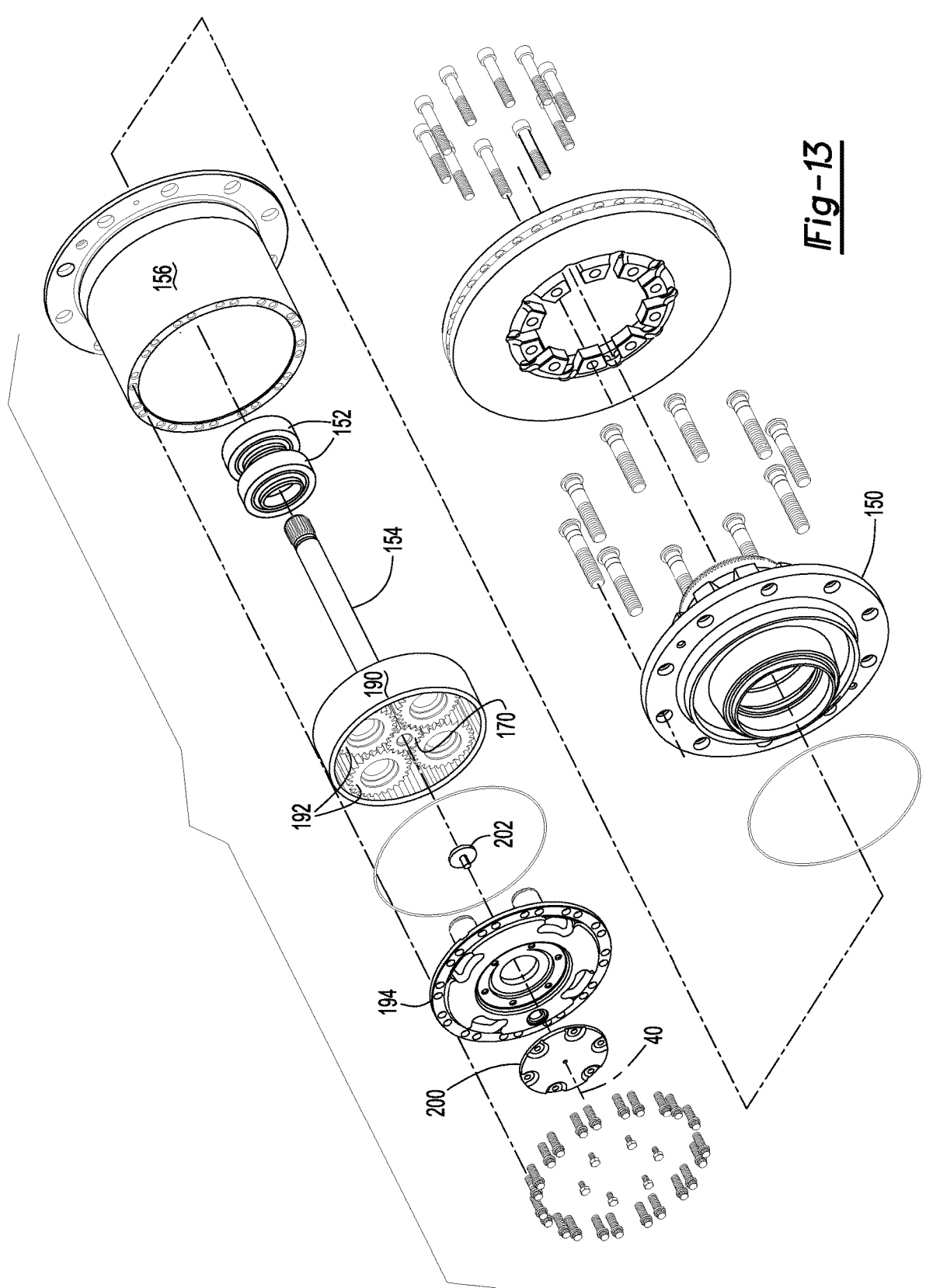
FIG. 13 is an exploded view of the wheel end assembly.

Referring primarily to FIGS. 11-13, the wheel hub 150 is rotatable about the wheel axis 40. For instance, the wheel hub 150 may encircle the spindle 114 and one or more wheel bearings 152 that rotatably support the wheel hub 150. The wheel hub 150 facilitates mounting of a wheel upon which a tire may be disposed. For instance, wheel hub 150 may include a plurality of lug bolts 160 that extend from the wheel hub 150 through corresponding holes in a wheel in a manner known by those skilled in the art.

One or more wheel bearings 152 are configured to rotatably support the wheel hub 150 upon the spindle 114. In the configuration shown, two wheel bearings 152 are provided that encircle the spindle 114 and that are encircled by the wheel hub 150.

The wheel end shaft 154 operatively connects the transmission module 54 to the gear reduction module 158. The wheel end shaft 154 is disposed in the spindle hole 142 and extends through the spindle 114. The wheel end shaft 154 is rotatable about the wheel axis 40. As is best shown in FIG. 2, the second gear 132 is rotatable about the wheel axis 40 with the wheel end shaft 154.

In some configurations and as is best shown in FIG. 12, the wheel end shaft 154 includes or is coupled to a sun gear 170. The sun gear 170 is rotatable about the wheel axis 40 with the wheel end shaft 154 and may engage the gear reduction module 158 or be part of the gear reduction module 158. The sun gear 170 may be disposed proximate an outboard end of the wheel end shaft 154 while the second gear 132 may be disposed proximate an inboard end of the wheel end shaft 154 that is disposed opposite the outboard end.

As is best shown in FIG. 2, a seal 180 may extend between the spindle 114 and the wheel end shaft 154. For instance, the seal 180 may be disposed inside the spindle hole 142 of the spindle 114 and may extend from the wheel end shaft 154 to the spindle 114 to help retain lubricant inside the hub housing 156 and facilitate lubrication of the gear reduction module 158.

Referring primarily to FIGS. 12 and 13, the hub housing 156 may extend from the wheel hub 150. For instance, the hub housing 156 may extend from the wheel hub 150 in an outboard direction that extends away from the transmission module 54. The hub housing 156 may be fastened to the wheel hub 150 such that the hub housing 156 and the wheel hub 150 are rotatable together about the wheel axis 40. The hub housing 156 may be fastened to the wheel hub 150 in any suitable manner, such as via the lug bolts 160 or with different fasteners. The hub housing 156 may cooperate with the wheel hub 150 to at least partially define a chamber or cavity that receives the gear reduction module 158.

The gear reduction module 158 provides gear reduction between the transmission 112 and the wheel hub 150. The gear reduction module 158 may be received inside the hub housing 156, the wheel hub 150, or both. The gear reduction module 158 may include reduction gearing that may have any suitable configuration. For instance, reduction gearing may employ bevel gears or a planetary gear set to provide gear reduction between the transmission module 54 and the wheel hub 150. In the configuration shown, the gear reduction module 158 employs a planetary gear set. In such a configuration, the gear reduction module 158 may include a ring gear 190, at least one planet gear 192, and a planet gear carrier 194.

Referring to FIGS. 12 and 13, the ring gear 190 may be configured as a ring that may extend around or encircle the wheel axis 40. The ring gear 190 may encircle the planet gears 192 and may have a set of teeth that extend toward the wheel axis 40 and mate or mesh with teeth of the planet gears 192. In the configuration shown, the ring gear 190 is disposed in the hub housing 156 and is fixedly positioned with respect to the spindle 114 such that the ring gear 190 does not rotate about the wheel axis 40. The hub housing 156 may be spaced apart from the ring gear 190 and may be rotatable about the wheel axis 40 with respect to the ring gear 190.

One or more planet gears 192 may be rotatably disposed between the sun gear 170 and the ring gear 190. Teeth of the planet gears 192 may mesh with teeth of the sun gear 170 and teeth of the ring gear 190. Each planet gear 192 may be rotatable about a different planet gear axis. More specifically, each planet gear 192 may be rotatably disposed on the planet gear carrier 194 and may be rotatable about a corresponding planet gear axis with respect to the planet gear carrier 194.

The planet gear carrier 194 supports the planet gears 192. For instance, the planet gear carrier 194 may include a plurality of shafts or pins that extend along a corresponding planet gear axis. Each shaft or pin may be received in a hole of a corresponding planet gear 192. The planet gear carrier 194 may be coupled to the hub housing 156 such that the planet gear carrier 194 is rotatable about the wheel axis 40 with the hub housing 156 and the wheel hub 150. In some configurations, the planet gear carrier 194 may be disposed at an outboard end of the hub housing 156 that faces away from the wheel hub 150. For instance, the planet gear carrier 194 may contact or engage the outboard end of the hub housing 156 and may be secured to the outboard end in any suitable manner, such as with one or more fasteners.

A hub cap 200 may be disposed on the planet gear carrier 194. The hub cap 200 may be fastened to the planet gear carrier 194 and may enclose or cover a through hole in the planet gear carrier 194 that may be disposed along the wheel axis 40. The wheel end shaft 154 may be supported on the hub cap 200. For instance, a pin or shaft 202 may extend along the wheel axis 40 from the hub cap 200 to the wheel end shaft 154 such that the wheel end shaft 154 is rotatably supported on the pin or shaft 202.

Referring to FIGS. 1 and 2, the brake assembly 58 facilitate braking of the wheel hub 150 to slow or stop rotation of the wheel hub 150 about the wheel axis 40. The brake assembly 58 is a friction brake and may be of any suitable type. For instance, the brake assembly 58 may be configured as a disc brake or a drum brake. In some configurations, the brake assembly 58 is fastened to the outboard transmission housing 110. For instance, the brake assembly 58 may be secured to the outboard transmission housing 110 with fasteners such as threaded fasteners.

A drive axle system as described above may help position an aisle of a vehicle closer to the ground by positioning the wheel axis above the rotor axis, which may be desirable in vehicles like a low floor bus. In addition, the drive axle system as described above may help increase the width of the aisle by reducing the axial length of the axle assembly, which may increase the lateral distance available between axle assemblies that are disposed on a common support structure. Providing an electric motor module and a transmission module on opposite sides of a mounting plate may help reduce heat conduction between the electric motor module and the transmission module, which may help improve performance. In addition, mounting the electric motor module with a gap between the electric motor module and the support structure may promote cooling of the electric motor, which may improve its operating efficiency and help reduce heat conduction between the electric motor module and other axle assembly components. Employing a mounting plate to mount the axle assembly to the support structure may simplify maintenance as the entire axle assembly may be removed without detaching the support structure from the vehicle. In addition, the entire axle assembly may be easily assembled to the support structure via the mounting plate as compared to assembling multiple axle assembly components to the support structure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle system comprising:
   a support structure that comprises a cradle and first and second arms that extend from the cradle; and
   an axle assembly comprising:
   a mounting plate that is fixedly coupled to the first and second arms, the mounting plate further comprising a first side and a second side that is disposed opposite the first side;
   an electric motor module that extends from the first side of the mounting plate;
   a transmission module that extends from the second side of the mounting plate; and
   a wheel end assembly that extends from the transmission module; and wherein the first and second arms separate the mounting plate from the cradle.

2. The drive axle system claim 1 wherein the electric motor module is spaced apart from and does not contact the cradle and the first and second arms.

3. The drive axle system of claim 1 further comprising a skid plate that extends under the electric motor module and that is fastened the support structure.

4. The drive axle system of claim 1 wherein the electric motor module further comprises a rotor that is rotatable about a rotor axis, a stator that encircles the rotor, and a coolant jacket that encircles the stator, wherein the coolant jacket further comprises a set of channels, and wherein the set of channels is not encircled by the mounting plate.

5. The drive axle system of claim 1 wherein the electric motor module further comprises a rotor and a rotor shaft that extends from the rotor, wherein the mounting plate defines a hole through which the rotor shaft extends, and wherein a bearing assembly is disposed in the hole and rotatably supports the rotor shaft.

6. The drive axle system of claim 5 further comprising a cover that is secured to the mounting plate, wherein the cover defines a cover hole through which the rotor shaft extends, wherein the cover receives a seal that extends between the cover and the rotor shaft.

7. The drive axle system of claim 1 wherein the wheel end assembly further comprises:

a wheel hub that is rotatable about a wheel axis;

a hub housing that extends from the wheel hub and away from the transmission module; and a gear reduction module that is received in the hub housing, the gear reduction module including a planet gear carrier that is coupled to the hub housing such that the planet gear carrier is rotatable about the wheel axis with the hub housing and the wheel hub.

8. The drive axle system of claim 7 wherein the planet gear carrier is disposed at an end of the hub housing that faces away from the wheel hub.

9. The drive axle system of claim 7 further comprising a hub cap that is fastened to the planet gear carrier.

10. The drive axle system of claim 7 wherein the wheel end assembly further comprises a wheel end shaft that is rotatable about the wheel axis and that operatively connects the transmission module to the gear reduction module, wherein the wheel end shaft further comprises a sun gear that meshes with a planet gear that is rotatably supported on the planet gear carrier.

11. The drive axle system of claim 10 wherein the transmission module further comprises a spindle through which the wheel end shaft extends, and the gear reduction module further comprises a ring gear that is disposed in the hub housing, wherein the ring gear is fixedly mounted to the spindle and is not rotatable about the wheel axis.

12. The drive axle system of claim 11 wherein the hub housing is rotatable about the wheel axis with respect to the ring gear.

13. The drive axle system of claim 11 wherein a seal is disposed inside the spindle and extends from the wheel end shaft to the spindle.

14. The drive axle system of claim 1 wherein the wheel end assembly further comprises a wheel end shaft that is rotatable about a wheel axis, the electric motor module further comprises a rotor that is rotatable about a rotor axis, and the transmission module further comprises an outboard transmission housing that extends from the mounting plate, a second gear that is rotatable about the wheel axis with the wheel end shaft, and a first gear that meshes with the second gear and is rotatable about the rotor axis with the rotor.

15. The drive axle system of claim 14 further comprising a lubricant baffle that extends from the mounting plate to the outboard transmission housing, wherein the first gear is received in the lubricant baffle.

16. The drive axle system of claim 15 wherein the second gear is at least partially received in the lubricant baffle.

17. The drive axle system of claim 14 further comprising a brake assembly that is fastened to the outboard transmission housing.

18. A drive axle system comprising:

a support structure that comprises a cradle and first and second arms; and an axle assembly comprising:

a mounting plate that is fixedly coupled to the first and second arms, the mounting plate further comprising a first side and a second side that is disposed opposite the first side;

an electric motor module that extends from the first side of the mounting plate;

a transmission module that extends from the second side of the mounting plate; and a wheel end assembly that extends from the transmission module, wherein the first and second arms are spaced apart from each other and extend from the cradle to the mounting plate.

19. A drive axle system comprising:

a support structure that comprises a cradle and first and second arms that extend from the cradle; and an axle assembly comprising:

a mounting plate that is fixedly coupled to the first and second arms, the mounting plate further comprising a first side and a second side that is disposed opposite the first side;

an electric motor module that extends from the first side of the mounting plate, wherein the electric motor module comprises a rotor and a rotor shaft that extends from the rotor;

a transmission module that extends from the second side of the mounting plate;

a wheel end assembly that extends from the transmission module; and a cover that is secured to the mounting plate, wherein the cover defines a cover hole through which the rotor shaft extends; and wherein the mounting plate defines a hole through which the rotor shaft extends and the rotor encircles the cover.

20. The drive axle system of claim 19 wherein the first and second arms separate the mounting plate from the cradle.

* * * * *